(12) United States Patent
Schuh et al.

(10) Patent No.: US 11,920,066 B2
(45) Date of Patent: Mar. 5, 2024

(54) ADHESIVE TAPE PARTICULARLY FOR OILY SURFACES

(71) Applicant: tesa SE, Norderstedt (DE)

(72) Inventors: Christian Schuh, Hamburg (DE); Yvonne Querdel, Ahrensburg (DE); Alexander Kutter, Hamburg (DE); Lars Guldbrandsen, Barsbüttel (DE)

(73) Assignee: tesa SE, Norderstedt (DE)

( * ) Notice: Subject to any disclaimer, the term of this patent is extended or adjusted under 35 U.S.C. 154(b) by 227 days.

(21) Appl. No.: 17/272,522

(22) PCT Filed: Aug. 20, 2019

(86) PCT No.: PCT/EP2019/072284
§ 371 (c)(1),
(2) Date: Mar. 1, 2021

(87) PCT Pub. No.: WO2020/043556
PCT Pub. Date: Mar. 5, 2020

(65) Prior Publication Data
US 2021/0324242 A1    Oct. 21, 2021

(30) Foreign Application Priority Data

Aug. 28, 2018 (DE) .................. 10 2018 214 534.2

(51) Int. Cl.
| C09J 7/35 | (2018.01) |
| C09J 7/38 | (2018.01) |
| C09J 123/16 | (2006.01) |
| C09J 163/00 | (2006.01) |

(52) U.S. Cl.
CPC .......... *C09J 7/383* (2018.01); *C09J 7/35* (2018.01); *C09J 123/16* (2013.01); *C09J 163/00* (2013.01); *C09J 2301/204* (2020.08); *C09J 2301/208* (2020.08); *C09J 2301/302* (2020.08); *C09J 2301/304* (2020.08); *C09J 2400/166* (2013.01); *Y10T 428/2804* (2015.01); *Y10T 428/2813* (2015.01); *Y10T 428/2826* (2015.01); *Y10T 428/2848* (2015.01); *Y10T 428/287* (2015.01); *Y10T 428/2883* (2015.01)

(58) Field of Classification Search
None
See application file for complete search history.

(56) References Cited

U.S. PATENT DOCUMENTS

| 4,133,731 A | 1/1979 | Hansen et al. |
| 4,820,746 A | 4/1989 | Rice et al. |
| 5,593,759 A * | 1/1997 | Vargas .................. C09J 7/20 428/354 |
| 6,565,969 B1 * | 5/2003 | Lamon .................. C09J 7/10 428/347 |
| 9,944,059 B2 | 4/2018 | Morral et al. |
| 10,266,809 B2 | 4/2019 | Rowan et al. |
| 2002/0121332 A1 * | 9/2002 | Merz .................. C09J 5/06 156/281 |
| 2016/0326413 A1 * | 11/2016 | Schuh .................. C09J 163/04 |
| 2020/0224067 A1 * | 7/2020 | Von Wedel-Parlow .... C09J 7/38 |

FOREIGN PATENT DOCUMENTS

| CN | 108026422 A | 5/2018 |
| DE | 102015217860 A1 | 11/2016 |
| DE | 102015217376 A1 | 3/2017 |
| DE | 102017202668 A1 | 8/2018 |
| EP | 0447855 A2 | 9/1991 |
| EP | 1078965 A1 | 2/2001 |
| EP | 1557449 A1 | 7/2005 |
| EP | 2529856 A1 | 12/2012 |
| EP | 3243885 A1 | 11/2017 |
| WO | 9408781 A1 | 4/1994 |
| WO | 2015002781 A2 | 1/2015 |
| WO | WO-2017042221 A1 * | 3/2017 ............. B32B 27/08 |
| WO | 2017067904 A1 | 4/2017 |

OTHER PUBLICATIONS

"Standard Practice for Rubber and Rubber Latices-Nomenclature", ASTM standard D1418-22, pp. 1-3, retrieved on Mar. 2, 2023 (Year: 2023).*
Donatas Satas, Handbook of Pressure Sensitive Adhesive Technology, 1999, pp. 153-203, 3rd. Ed., Satas & Associates, Warwick, Rhode Island, U.S.A.
International Search Report for International Application No. PCT/EP2019/072284, dated Nov. 29, 2019.
China National Intellectual Property Administration, First Office Action for China Patent Application No. 201980051823.8, dated Jan. 21, 2022, 3 pages.
China National Intellectual Property Administration, First Office Action for China Patent Application No. 201980051823.8 with translation, dated Jan. 21, 2022, 10 pages.
China National Intellectual Property Administration, last set of amended claims dated Jun. 23, 2022 for China Patent Application No. 201980051823.8, 4 pages.
China National Intellectual Property Administration, Notification to Grant Patent Right for Invention for China Patent Application No. 201980051823.8 with translation, dated Jul. 5, 2022, 3 pages.

* cited by examiner

*Primary Examiner* — Anish P Desai
(74) *Attorney, Agent, or Firm* — Price Heneveld LLP

(57) ABSTRACT

The invention relates to an adhesive tape, comprising at least one layer of a first, heat-curable adhesive material and, on one of the surfaces of the heat-curable adhesive material layer, a layer of a second, pressure-sensitive adhesive material, characterized in that the second, pressure-sensitive adhesive material is based on one or more unvulcanized rubbers having a saturated carbon chain of the polymethylene type.

21 Claims, 4 Drawing Sheets

ADHESIVE TAPE PARTICULARLY FOR OILY SURFACES

CROSS-REFERENCE TO RELATED APPLICATIONS

This application is a national stage application under 35 U.S.C. § 371 that claims the benefit of priority under 35 U.S.C. § 365 of International Patent Application Serial No. PCT/EP2019/072284, filed on Aug. 20, 2019, designating the United States of America, which in turn claims the benefit of priority under 35 U.S.C. § 119 of German Patent Application Serial No. 10 2018 214 534.2, filed Aug. 28, 2018, the contents of which are relied upon and incorporated herein by reference in their entirety.

FIELD OF THE DISCLOSURE

The disclosure relates to adhesive bonding of substrates with oil-covered surfaces in industry, such as auto-making.

BACKGROUND

The adhesive bonding of substrates with oil-covered surfaces represents a difficulty in industry, such as automaking, for example. There is a desire for the adhesive tapes to exhibit immediate attachment to the substrate surfaces in order to produce a preliminary assembly which can be handled in the ongoing process. There is also an intention that high bond strengths are achieved in the eventual component.

Oil-fouled or oil-covered surfaces—metal surfaces, for instance—pose a challenge in respect of both requirements, since the attachment of the adhesive on the film of oil is often unsuccessful, and/or the film of oil prevents the adhesive from being able to flow onto the actual substrate surface effectively, and/or prevents it developing effective adhesive interactions with that surface.

Driving comfort is impaired by vibrations of bodywork components and other components in the automobile and the associated noise produced. This effect is known in technical circles as "Noise Vibration Harshness" (NVH). One of the possible triggers for such vibrations is the relative movement of sheet metal parts that are in contact with one another. One remedy is to use adhesive tapes. The use of adhesive tapes is advantageous especially in the production of folded flanges (hem flanges).

The folding process is described in detail in specifications U.S. Ser. No. 10/266,809 and U.S. Pat. No. 9,944,059B2, for example. Typical bond strengths of suitable adhesives on galvanized steel are shown by WO2015002781 A to be about 14 MPa. Epoxy-based, film-backed adhesives for flange bonding are also known—see EP 3 243 885 A. Also mentioned therein is that the metal substrates to be bonded are contaminated in automobile bodyshell construction, with grease or oil, for example.

EP 2 529 856 A discloses an epoxy-based film of adhesive for flange bonding. It addresses the contamination of metal substrates with oil, and the problems which result from this. The flanged connections sought are those which—further to an adhesive bond—do not require clamping. The films of adhesive disclosed, however, do not adequately solve these problems, since in the Methods section, both in the preparation of lap-shear tests and in peel adhesion measurements, the bonds are clamped.

Reactive adhesive films—frequently these are heat-activatable reactive films—with pressure-sensitive adhesive structures on one or both sides are disclosed in EP 1 078 965 A. EP 1 557 449 A as well discloses structured adhesives having domains of pressure-sensitive adhesive and of heat-activatable adhesive. These specifications, however, do not teach that such a construction is used for bonding on contaminated metal substrates or affords particular advantages for such applications. In particular there is no teaching as to which pressure-sensitive adhesive systems are needed in order for this to operate.

WO 1994/008781 A discloses product constructions comprising a curable core with pressure-sensitive adhesive, discontinuous structures, which can be used for the flanging operation. The core of the teaching therein is that in the curing step, the structured pressure-sensitive adhesives dissolve in the epoxy adhesive, and so the pressure-sensitive adhesive is absorbed by the epoxy adhesive. Bonding on greasy and/or oily surfaces is not described. These adhesives are also unable to develop any initial adhesion on uncleaned metal substrates, since the outer layer has to be selected such that it can be blended with the reactive epoxy core layer. This implies the use of relatively polar adhesives, such as acrylates, for example.

It is an object of the present invention to optimize the bonding—especially in automaking—on greasy and/or oily substrates. In relation to the bonding accompanying flange production, the desire is to be able to omit the clamping that has been employed to date. For this purpose it is desirable for the adhesive tape to be employed for these purposes not only to achieve high ultimate bond strengths, but also to have effective initial adhesion on the greasy or oily surface itself. It is an advantage if the initial peel adhesion forces on the substrate are higher than the forces that must be expended to remove a liner from the adhesive tape.

SUMMARY OF THE DISCLOSURE

It has been possible to achieve the object by means of an adhesive tape as defined in the main claim in general and in the dependent claims, in advantageous refinements, in more detail. The invention relates accordingly to an adhesive tape comprising at least one layer of a first, heat-curable adhesive and also, on one of the surfaces of the heat-curable layer of adhesive, a layer of a second, pressure-sensitive adhesive, the second, pressure-sensitive adhesive being based on one or more rubbers having a saturated carbon chain of the polymethylene type.

According to an aspect of the disclosure, an adhesive tape is provided that includes: at least one layer of a heat-curable adhesive; and a second layer of a pressure-sensitive adhesive on one surface of the at least one layer of the heat-curable adhesive. Further, the pressure-sensitive adhesive of the second layer is based on one or more rubbers having a saturated carbon chain of the polymethylene type.

According to another aspect of the disclosure, an adhesive tape is provided that includes: at least one layer of a heat-curable adhesive; and a second layer of a pressure-sensitive adhesive on one surface of the at least one layer of the heat-curable adhesive. Further, the pressure-sensitive adhesive of the second layer is based on one or more rubbers having a saturated carbon chain of the polymethylene type. In addition, the second layer of the pressure-sensitive adhesive comprises at least 50% (by weight) of polymethylene rubbers and 50 to 300 parts of solid tackifying resins relative to 100 parts of the polymethylene rubbers in solid form, the solid tackifying resins having a softening temperature of greater than 60° C.

DETAILED DESCRIPTION OF THE PREFERRED EMBODIMENTS

Figure 1A:
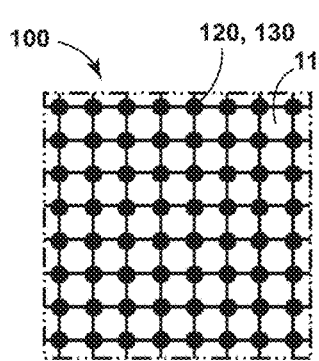
FIGS. 1A-1M are schematic plan views of adhesive tapes 100 with geometries in which the second, pressure-sensitive layer of adhesive and/or the third, pressure-sensitive layer of adhesive is arranged on the respective surface of the first, heat-curable layer of adhesive.

Adhesive tapes in the sense of the invention are intended to comprehend all sheetlike or tapelike carrier structures which are fully or partially coated on one or both sides with pressure-sensitive adhesive, the carrier in the present case being understood to be the first, heat-curing layer of adhesive.

The term therefore includes not only conventional tapes but also labels, sections, diecuts (punched sheetlike carrier structures coated with pressure-sensitive adhesive), two-dimensionally extended structures (for example, films), and the like, including multilayer arrangements.

In one preferred refinement of the adhesive tape of the invention, on the other surface of the layer of the first, heat-curable adhesive, there is a layer of a third, pressure-sensitive adhesive. The second and third pressure-sensitive adhesives may differ from one another, but more particularly may also be chemically identical. The further details relating to the second layer of adhesive can be realized, in accordance with the invention, independently of whether there is or is not a third layer of adhesive. The further details relating to the third layer of adhesive relate, of course, only to those embodiments of the adhesive tape of the invention where such a third layer of adhesive is indeed present. The layer of the first, heat-curable adhesive also serves as a carrier layer for the layer or layers of pressure-sensitive adhesive, and is therefore preferably present as an inherently coherent (uninterrupted, full-area) layer, especially preferably having a substantially constant thickness. With preference, the second, pressure-sensitive adhesive is not present over the full area on the layer of the first, heat-curable adhesive, and so on the corresponding surface of the adhesive tape there are one or more regions of the second adhesive as well as one or more regions which are free of the second adhesive. Also very preferably, the third, pressure-sensitive adhesive as well is not present over the full area on the—opposing surface of the—layer of the first, heat-curable adhesive, and so, on the corresponding opposing surface of the adhesive tape, there are one or more regions of the third adhesive as well as one or more regions which are free of the third adhesive. In that case, therefore, the respective sides of adhesive tape have a corresponding structured configuration.

The term "layer" in the sense of this specification therefore does not necessarily mean that the layer is an inherently coherent (uninterrupted, full-area) layer, but instead that the geometry formed by the adhesive in question, being a full-area or interrupted geometry or a geometry formed of part-areas, extends substantially two-dimensionally in one plane. The first and, where present, the second, pressure-sensitive layers of adhesive are situated here, for example, advantageously in a plane which is formed by the application of these pressure-sensitive adhesives on the first, heat-curable layer of adhesive.

The layers of the second pressure-sensitive adhesive and of the third pressure-sensitive adhesive may be different or else identical in terms of their layer thicknesses and/or their geometric arrangement and configuration on the heat-curable layer of adhesive. In advantageous embodiments, the thickness extent of the first and/or second, pressure-sensitive layer of adhesive—with interrupted or part-area layers in the regions in which there is adhesive—is substantially constant. It is, however, also possible for the first and/or the second layer of adhesive to have regions of different thickness and/or, in the case of layers with a part-area formation, part-areas of different thickness.

Depending on application, the first, reactive adhesive layer is advantageously between 50 µm and 3000 µm thick. For applications in the automobile bodyshell, where there are in some cases relatively large tolerances to be bridged in the bond line, thicker reactive layers in the region greater than 250 µm, preferably greater than 450 µm, more particularly between 350 µm and 1000 µm are particularly useful. For special-purpose applications with exceedingly large gap dimensions, reactive layers between 1000 µm and 3000 µm are particularly suitable.

The layer thicknesses of the layers of the second pressure-sensitive adhesive and, where present, of the third pressure-sensitive adhesive are preferably less than 50 µm, or more preferably less than 30 µm. Particularly noteworthy are structured pressure-sensitive adhesive layers in the range from 10 µm to 45 µm, since on the one hand they enable rapid attachment to oily substrates, but on the other hand they have surprisingly little adverse effect on the bond strength of the cured adhesive tape. If there is more time available for the attachment process, then layer thicknesses in the range between 5 to 25 µm are also suitable.

If relatively coarse structural elements of this kind are to be bonded, possibly carrying larger amounts of oil (more than 6 g/m$^2$, for instance) then it may be advantageous to make the oil-adhesive layers (second, pressure-sensitive adhesive layer and, where present, third, pressure-sensitive adhesive layer) somewhat thicker. Structures having layer thicknesses between 30 µm to 150 µm, more particularly greater than 45 µm and preferably less than 150 µm, are suitable for this purpose.

With identical configuration of the geometric arrangement, the layers may only satisfy the same basic principle—especially as described in the advantageous refinements presented hereinafter—or they may be arranged identically—mirror-symmetrically, point-symmetrically and/or projection-identically (that is, congruent on projection perpendicular to the heat-curable layer of adhesive).

In an advantageous refinement, the surface coverage of the layer of the second, pressure-sensitive adhesive on the layer of the first, heat-curable adhesive is between 5% and 50%. In a more advantageous refinement, the surface coverage of the layer of the third, pressure-sensitive adhesive on the layer of the first, heat-curable adhesive is also between 5% and 50%.

In an advantageous refinement, the layer of the second, pressure-sensitive adhesive is present in a regular geometric structure on the layer of the first, heat-curable adhesive. In a more advantageous refinement, the layer of the third, pressure-sensitive adhesive is also present in a regular geometric structure on the layer of the first, heat-curable adhesive.

In another advantageous refinement, the layer of the second, pressure-sensitive adhesive is present in an irregular geometric structure on the layer of the first, heat-curable adhesive. In a more advantageous refinement, the layer of the third, pressure-sensitive adhesive is also present in an irregular geometric structure on the layer of the first, heat-curable adhesive.

In an advantageous refinement, the layer of the second pressure-sensitive adhesive is present in the form of geometric shapes extending in at least one direction continuously over the corresponding surface of the layer of the first, heat-curable adhesive. This may in particular be in the form of lines, for instance in the form of straight or wavy lines, or lines with some other design, of pressure-sensitive adhesive, which extend from one edge of the adhesive tape to the opposite edge of the adhesive tape, arranged, for example, parallel to one of the adhesive tape edges, diagonally over the adhesive tape, or otherwise.

In a further advantageous refinement, the layer of the third pressure-sensitive adhesive is present in the form of geometric shapes extending in at least one direction continuously over the correspondingly opposing surface of the layer of the first, heat-curable adhesive. Again, this may in particular be in the form of lines, for instance in the form of straight or wavy lines, or lines with some other design, of pressure-sensitive adhesives, which extend from one edge of the adhesive tape to the opposite edge of the adhesive tape, arranged, for example, parallel to one of the adhesive tape edges, diagonally over the adhesive tape, or otherwise.

In another advantageous refinement, the layer of the second pressure-sensitive adhesive is in the form of geometric shapes arranged discontinuously on the corresponding surface of the layer of the first, heat-curable adhesive—for example, in the form of dots, in the form of rings, in the form of diamonds, stars or line sections, to give an illustrative mention of just a few geometries. The above recitation is not meant in any way to be limiting.

In a further refinement, the layer of the third pressure-sensitive adhesive is also present in the form of geometric shapes arranged discontinuously on the corresponding opposing surface of the layer of the first, heat-curable adhesive.

On the surface of the adhesive tape of the invention, the layer of the second pressure-sensitive adhesive and/or the layer of the third pressure-sensitive adhesive may alternatively be present not only in the form of geometric shapes extending continuously over the respective surface of the layer of the first, heat-curable adhesive, but also in the form of geometric shapes arranged discontinuously on the—respective—surface of the layer of the first, heat-curable adhesive.

It is advantageous for the layer of the second, pressure-sensitive adhesive and/or the layer of the third pressure-sensitive adhesive to be present on the respective surface of the layer of the first, heat-curable adhesive in the form of uninterrupted and/or interrupted lines which have a width of not more than 1.5 mm.

In the converting of the adhesive tape it is advantageous if no cut edges are formed that possess no applied pressure-sensitive adhesive at all—which, therefore, run exclusively in the region of the first, heat-curable adhesive—or, if such cut edges are formed, then the distance to the next region of pressure-sensitive adhesive is small. Otherwise, on application of the adhesive tape, there would be marginal regions which initially did not, or did not sufficiently well, attach to the substrate. For this purpose it is advantageous if the layer of the second pressure-sensitive adhesive and/or the layer of the third pressure-sensitive adhesive is arranged on the layer of the first, heat-curable adhesive in such a way that there are no regions of the respective surface of the layer of the first adhesive, not covered by the second and/or third adhesive, that have a longest extent longer than 5 cm, preferably 3 cm, very preferably 1 cm.

The application of the second, pressure-sensitive layer of adhesive and/or of the third, pressure sensitive layer of adhesive to the first, heat-curing layer of adhesive, or the lamination of the respective layers together, can be accomplished by the methods known to the skilled person. Accordingly, for example, the first and/or the second, pressure-sensitive layer of adhesive—even, in particular, when these layers have a discontinuous formation—may be applied using a die with shim insert (spacer sheet) and/or using a matrix roll and/or by screen printing, to give, illustratively, just a number of methods.

Further subjects of the invention, therefore, are the aforesaid methods for producing adhesive tapes, especially adhesive tapes as described in accordance with the invention, and preferably adhesive tapes of this kind for flange bonding with initial adhesion on oily metals.

Figure 1B:
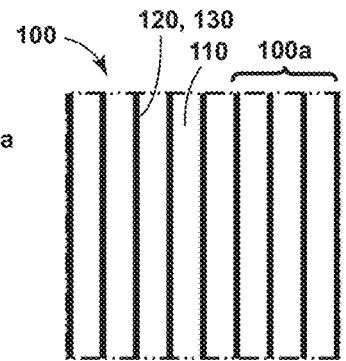
Figure 1C:
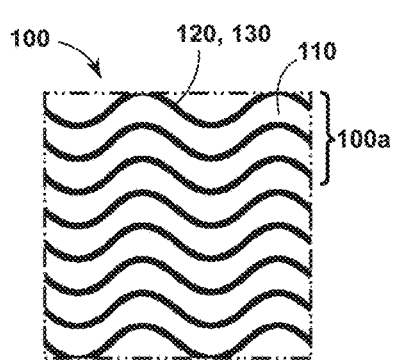
Figure 1D:
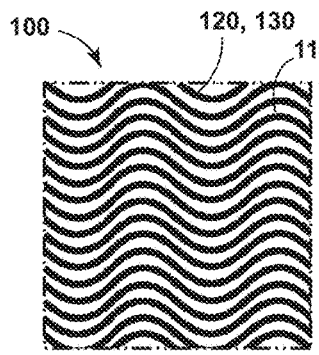
Figure 1E:
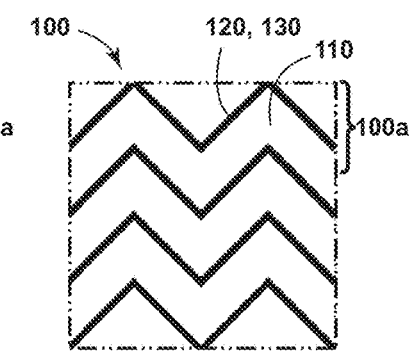
Figure 1F:
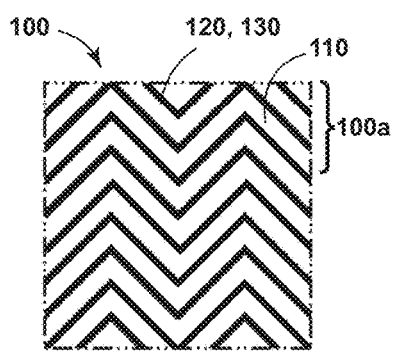
Figure 1G:
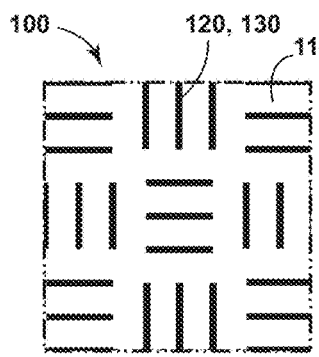
Figure 1H:
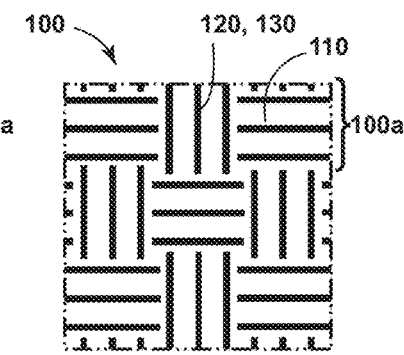
Figure 1I:
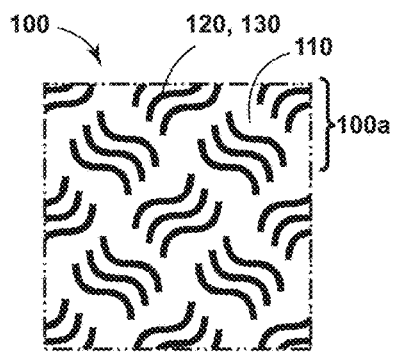
Figure 1J:
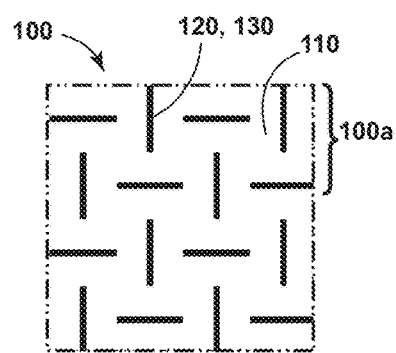
Figure 1K:
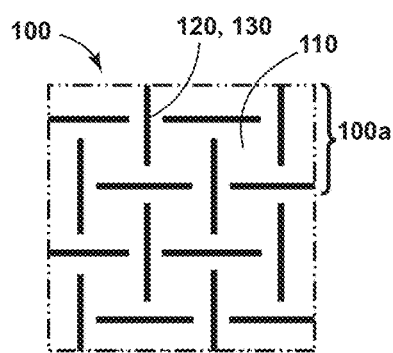
Figure 1L:
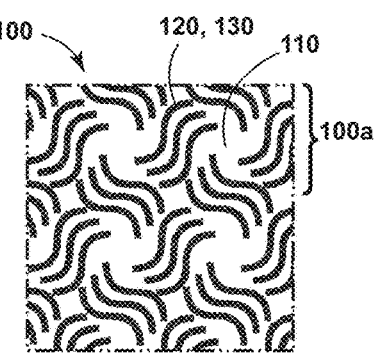
Figure 1M:
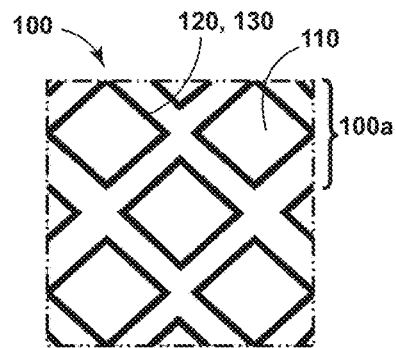
Figure 2A:
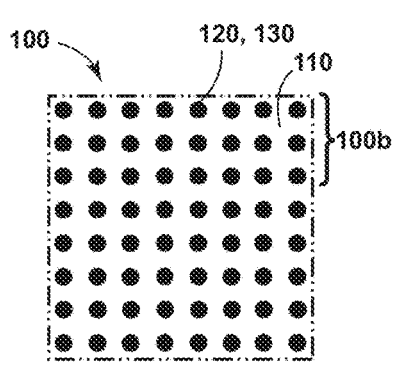
FIGS. 2A-2M are schematic plan views of adhesive tapes 100 with geometries that are matrixed in which the second, pressure-sensitive layer of adhesive and/or the third, pressure-sensitive layer of adhesive is arranged on the respective surface of the first, heat-curable layer of adhesive.
Figure 2B:
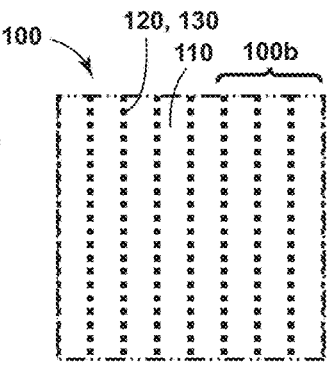
Figure 2C:
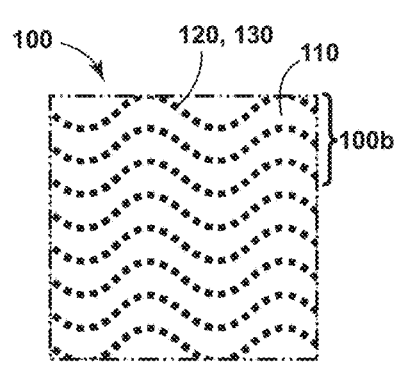
Figure 2D:
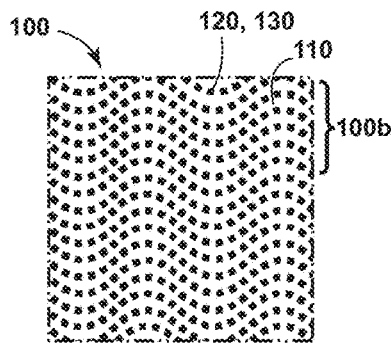
Figure 2E:
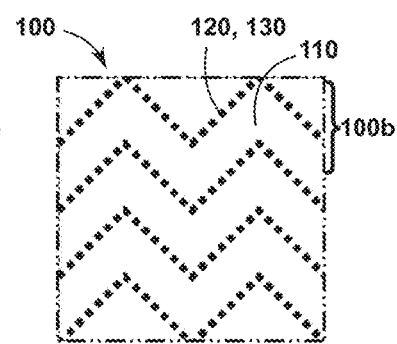
Figure 2F:
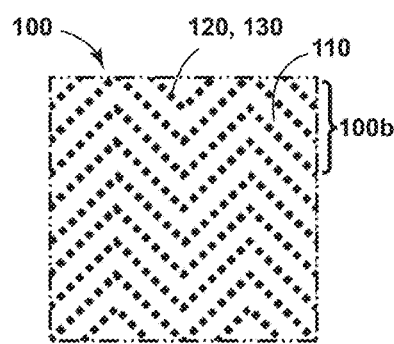
Figure 2G:
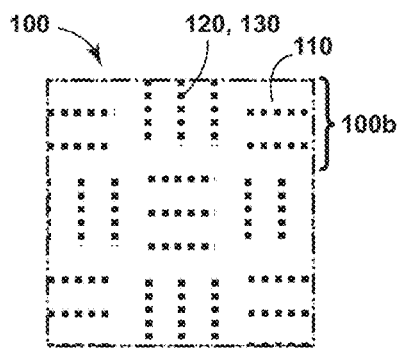
Figure 2H:
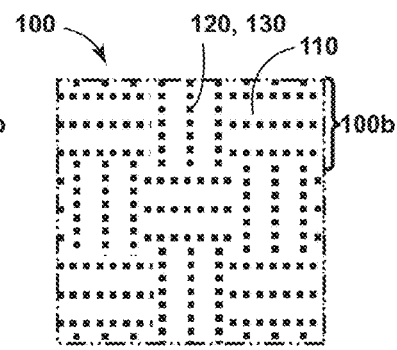
Figure 2I:
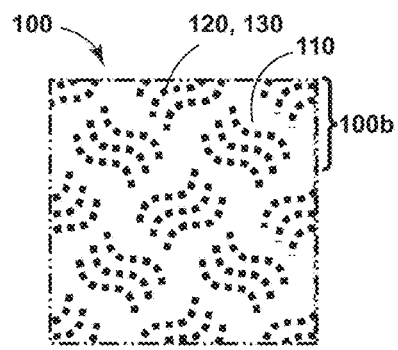
Figure 2J:
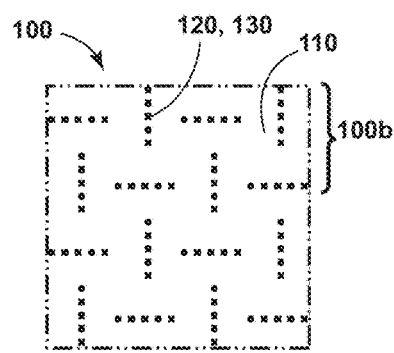
Figure 2K:
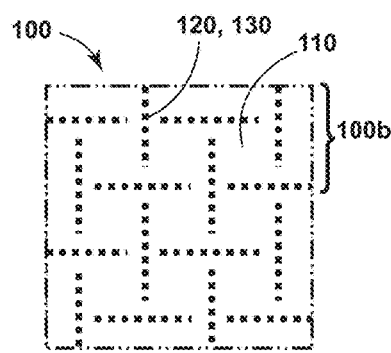
Figure 2L:
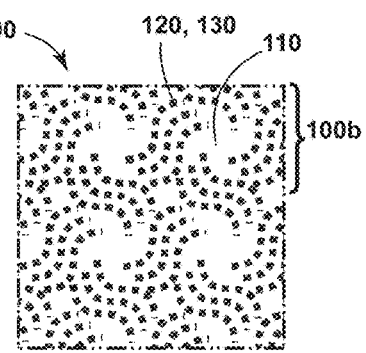
Figure 2M:
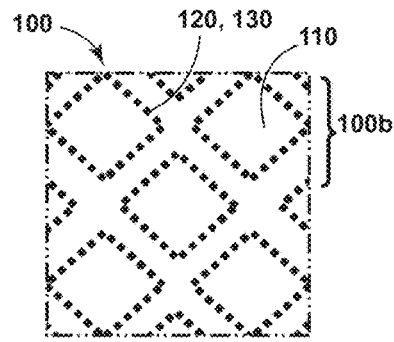

FIGS. 1A-1M and 2A-2M illustrate adhesive tapes 100 with geometries 100a in which the second, pressure-sensitive layer of adhesive 120 and/or the third, pressure-sensitive layer of adhesive 130 might be advantageously arranged on the respective surface of the first, heat-curable layer of adhesive 110. Some of these figures show arrangements in which cuts through the adhesive tape always also cut pressure-sensitive adhesive regions—for which, therefore, it is not possible to place any straight lines through the figure without contacting pressure-sensitive adhesive regions. In FIGS. 2A-2M, the lines which form the geometries 100b are themselves matrixed. All of the representations shown are merely illustrative and do not limit the inventive concept to these geometries.

Adhesives

Reactive adhesives are adhesives for which the final bond strengths are brought about only through a curing reaction of the components of the adhesive. Typically, therefore, reactive adhesives comprise at least one reactive polymer component and at least one curative component.

The very good adhesion properties and strength properties of the reactive adhesives on various substrate surfaces are determined in particular by the development of intermolecular bonds in the course of the curing process. The curing reaction here takes place typically according to basic principles of polymerization, of polyaddition, or of polycondensation.

The curing reaction is activated typically by external supply of energy, though may also start simply through the bringing-together of the reactive components. External supply of energy may take place, for example, in the form of energetic radiation (for example, light, UV light, laser light, electron beams) and/or by mechanical energy (for example, shaking, stirring, ultrasound) and/or by thermal supply of energy (heating); further activation possibilities for corresponding reactive adhesives may be microwaves or plasma treatment. Typically, though not mandatorily, the curing is also carried out under pressure, in order, for instance, to expel cleavage products of low molecular mass of solvent residues, to achieve improved adhesion and adhesive strength, and to increase the strength of the bond.

If the curing reaction requires a supply of heat, such adhesives are referred to as warmth- and heat-curing adhesives. In the context of this specification, no distinction is made between warmth- and heat-curing adhesives linguistically, and hence the term "heat-curing adhesives" embraces, fundamentally, all reactive adhesives which require thermal activation for the curing reaction. Heat-curing adhesives in a narrow sense are understood in particular to be those reactive adhesives for which the activation temperature of the curing reaction is at least 50° C., preferably at least 80° C., more preferably at least 100° C., and even more preferably still at least 150° C.

Since the curing reaction of reactive, heat-curing adhesives is a chemical crosslinking reaction, the process may be detected using dynamic scanning calorimetry (DSC) by way of the associated enthalpy change, more particularly by DSC measurement in the dynamic process according to DIN 53765:1994-03—see sections 2.2.5, 7.3 and 8.4 therein. In this case, first of all, conditioning takes place in a heating procedure up to 100° C. (in the case of systems having activation temperatures below 120° C., up to about 20° C. below the lowest activation temperature), followed by cooling to −140° C., and the second heating process is run to above the activation range. The activation temperature for the data in this specification is understood as the extrapolated onset temperature $T_{RO}^E$ according to DIN 53765:1994-03 in the second heating process, unless specifically indicated otherwise.

Reactive adhesives at room temperature may be completely non-adhesive, or else may have greater or lesser pressure-sensitive adhesive properties, which are differentiated, however, from the adhesive properties brought about by the curing reaction.

Pressure-sensitive adhesiveness is the property of a substance whereby it enters into a permanent bond to a substrate even under relatively weak applied pressure at the service temperature, typically just at room temperature (defined here as 23° C.). Substances which possess this property are referred to as pressure-sensitive adhesives (PSAs). PSAs have been known for a long time. After use, they can often be detached from the substrate again substantially without residue. PSAs generally have a permanent intrinsic tack at room temperature, thus having a certain viscosity and touch-tackiness enabling them to wet the surface of the respective substrate even with low applied pressure. The capacity of a PSA to adhere to materials and transmit forces derives from the adhesion capacity and the cohesion of the PSA.

PSAs may be considered as liquids of extremely high viscosity with an elastic component. PSAs, accordingly, have particular, characteristic viscoelastic properties which result in the durable intrinsic tack and adhesiveness. A characteristic of these adhesives is that when they are mechanically deformed, there are processes of viscous flow and there is also development of elastic forces of recovery. The two processes have a certain relationship to one another in terms of their respective proportion, depending not only on the precise composition, the structure and the degree of crosslinking of the PSA in question, but also on the rate and duration of the deformation, and on the temperature.

The proportion of viscous flow is necessary for the achievement of adhesion. Only the viscous components, brought about by macromolecules of relatively high mobility, permit effective wetting and effective flow onto the substrate that is to be bonded. A high viscous flow component results in high pressure-sensitive adhesiveness (also referred to as tack or surface stickiness) and hence often also in a high peel adhesion. Highly crosslinked systems, crystalline polymers or polymers with glasslike solidification lack flowable components and in general are therefore devoid of tack or at least possess only little tack.

The proportional elastic forces of recovery are necessary for the achievement of cohesion. They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For more precise description and quantification of the extent of elastic and viscous components, and also of the relationship between the components, the variables of storage modulus (G') and loss modulus (G") are employed, and can be determined by means of dynamic mechanical analysis (DMA). G' is a measure of the elastic component, G" a measure of the viscous component, of a substance. Both variables are dependent on the deformation frequency and the temperature. The variables can be determined using a rheometer. In that case, for example, the material under investigation, in the form of a plane-parallel layer, is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle θ. The storage modulus G' is defined as follows in Equation (I):

$$G'=(\kappa/\gamma)*\cos(\delta) \qquad (I)$$

where κ=shear stress, γ=deformation, and δ=phase angle=phase shift between shear stress vector and deformation vector. The definition of the loss modulus G" is as follows in Equation (II):

$$G''=(\kappa/\gamma)*\sin(\delta) \qquad (II)$$

where κ=shear stress, γ=deformation, and δ=phase angle=phase shift between shear stress vector and deformation vector.

A substance and the layer produced from it are considered in general to be pressure-sensitive adhesive, and are defined as such for the purposes of this specification, when at room temperature, here by definition at 23° C., in the deformation frequency range from $10^0$ to $10^1$ rad/sec, G' is situated at least partly in the range from $10^3$ to $10^7$ Pa and when G" is likewise situated at least partly within this range. "Partly" means that at least a section of the G' curve lies within the window which is subtended by the deformation frequency range from $10^0$ inclusive to $10^1$ inclusive rad/sec (abscissa) and by the range of the G' values from $10^3$ inclusive to $10^7$ inclusive Pa (ordinate), and if at least a section of the G" curve is likewise situated within this window. Within this region, which in a matrix plot of G' and G" (G' plotted as a function of G") may also be termed the viscoelastic window for pressure-sensitive adhesive applications or as the PSA window according to viscoelastic criteria, there are in turn different sectors and quadrants which characterize more closely the pressure-sensitive adhesive properties anticipated from the respectively associated substances. Within this window, substances with high G" and low G' are distinguished in general, for example, by a high peel adhesion and a low shear strength, while substances with a high G" and high G' are distinguished both by high peel adhesion and by a high shear strength.

In general, the knowledge concerning relationships between rheology and pressure-sensitive adhesiveness is prior art and is described for example in D. Satas, "Handbook of Pressure Sensitive Adhesive Technology", Third Edition, 1999, pages 153 to 203.

First, Heat-Curable Adhesive

In one preferred embodiment of the adhesive tape of the invention, the first, heat-curable adhesive also possesses pressure-sensitive adhesive properties. Advantageous heat-curable adhesives are those, for example, based on an epoxy reactive system. The first, heat-curable adhesive may therefore preferably comprise epoxy resins and also at least one epoxy resin curing agent.

With preference, the first, heat-curable adhesive comprises one or more polymers, optionally one or more tackifying resins, one or more reactive resins—with particular advantage, epoxy resins—and at least one initiator and/or curing agent and/or accelerator—more particularly epoxy resin curing agent —, with the reactive resins being present in a weight excess over the sum total of the polymers and the optional tackifier resins, and the at least one polymer in the uncured state of the adhesive being present as a continuous polymer phase.

The designation "tackifying resin", or "tackifier resin", is understood by the skilled person to refer to a resin-based substance which enhances the tack. Tackifying resins which can be used as a main component in the self-adhesive composition, for example, include, in particular, hydrogenated and unhydrogenated hydrocarbon resins and polyterpene resins. Those preferably suitable include hydrogenated polymers of dicyclopentadiene (for example, Escorez 5300er series; Exxon Chemicals), hydrogenated polymers of preferably $C_8$ and $C_9$ aromatics (for example, Regalite and Regalrez series; Eastman Inc., or Arkon P series; Arakawa). These resins may come from hydrogenation of polymers from pure aromatic streams, or else may be based through hydrogenation of polymers on the basis of mixtures of different aromatics. Also suitable are partly hydrogenated polymers of $C_8$ and $C_9$ aromatics (for example, Regalite and Regalrez series; Eastman Inc., or Arkon M; Arakawa), hydrogenated polyterpene resins, (for example, Clearon M; Yasuhara), hydrogenated $C_5/C_9$ polymers (for example, ECR-373; Exxon Chemicals), aromatic-modified, selectively hydrogenated dicyclopentadiene derivatives (for example, Escorez 5600er series; Exxon Chemicals). The aforesaid tackifying resins may be used either alone or in a mixture.

Hydrogenated hydrocarbon resins are a particularly suitable blending component, as described for example in EP 0 447 855 A1, U.S. Pat. Nos. 4,133,731 A and 4,820,746 A, since the absence of double bonds means that crosslinking cannot be disrupted and, moreover, a high aging resistance is achieved. Furthermore, however, it is also possible to use unhydrogenated resins, if crosslinking promoters are employed such as polyfunctional acrylates, for example. Other unhydrogenated hydrocarbon resins, unhydrogenated analogues of the above-described hydrogenated resins, may also be used.

It is possible, additionally, to use rosin-based resins (for example, Foral, Foralyn). The aforementioned rosin resins include, for example, natural rosin, polymerized rosin, partly hydrogenated rosin, fully hydrogenated rosin, esterified products of these rosin varieties (such as glycerol esters, pentaerythritol esters, ethylene glycol esters, and methyl esters), and rosin derivatives (such as disproportionation rosin, fumaric acid-modified rosin, and lime-modified rosin).

The tackifying resins are, optionally, polyterpene resins based on α-pinene and/or α-pinene and/or δ-lime, or terpene phenolic resins. Any desired combinations of these may be used in order to adjust the properties of the resultant PSA in line with requirements. Reference may be made expressly to the representation of the state of knowledge in D. Satas, "Handbook of Pressure Sensitive Adhesive Technology", Second Edition, 1989. Resins whose use is particularly preferred are (partly) hydrogenated hydrocarbon resins of the kind sold, for example, by the company Eastman under the tradenames Eastotac and Regalite.

The weight amount of the foregoing resins is 30 to 130 phr, preferably 50 to 120 phr, more preferably 60 to 110 phr. The details in phr that are given in the context of this specification denote parts by weight of the relevant component, based on 100 parts by weight of all of the EPDM polymer components of the PSA—i.e., without taking into account the tackifying resins, for example. These EPDM polymer components encompass all solid EPDM rubbers and so any liquid EPDM rubbers that may be present (at room temperature). Further, the wt % detail is always based on the composition of the overall PSA.

Heat-curing adhesives that are advantageous in accordance with the invention are, for example, those as described in DE 10 2015 217 860 A. That specification describes adhesive tapes comprising a heat-curing adhesive comprising at least one polymer, optionally a tackifying resin, and at least one reactive resin, where the adhesive, per 100 parts of polymer and tackifying resin, contains at least 104 parts of the at least one reactive resin, and further comprising at least one initiator and/or curing agent and/or accelerator, the adhesive being a pressure-sensitive adhesive and the at least one polymer being present, in the uncured state of the PSA, as a continuous polymer phase. For 100 parts of polymer, the adhesive preferably contains at least 120 parts of reactive resin, more preferably at least 200 parts of reactive resin, more particularly at least 300 parts of reactive resin. Present advantageously as reactive resin is at least one epoxy resin, preferably at least one epoxy resin based on bisphenol A, bisphenol S, bisphenol F and epoxy novolac, an epoxy-cresol novolac or an epoxidized nitrile rubber. The polymer may be an elastomer or a thermoplastic, for example. In a very preferred procedure, the one polymer together with the optional tackifying resin is per se not a pressure-sensitive adhesive. The at least one reactive resin is preferably in homogeneous solution at least partly, preferably completely, in the continuous polymer phase. The polymer may be selected, for example, from the group consisting of polyurethanes, nitrile-butadiene rubbers, polyamides, poly(etheretherketone) (PEEK), poly(sulfone) (PSU), and poly(ethersulfone) (PES). The short-term temperature resistance of the uncured adhesive tape is advantageously greater than 35° C., preferably 45° C., more preferably greater than 50° C. At least one of the at least one reactive resin is preferably a solid having a softening temperature of at least 45° C. or has a viscosity at 25° C. of at least 20 Pa s, preferably 50 Pa s, more particularly at least 150 Pa s. At least one of the at least one epoxy resin preferably has on average more than two epoxide groups per molecule. The peel adhesion of the uncured PSA on steel is favorably at least 1 N/cm; the bond strength, measured by dynamic shear test, on the steel is at least 5 MPa, preferably 10 MPa, more particularly greater than 15 MPa.

The polymer is advantageously selected from the group of the polyurethanes, in which case the polyurethane is semicrystalline and in the DSC measurement exhibits a melting peak or crystallization peak that corresponds to an enthalpy of fusion of at least 5 J/g, preferably of 25 J/g, and more preferably of 40 J/g.

Heat-curing adhesives which can be employed advantageously in accordance with the invention are the examples K1 to K6 in DE 10 2015 217 860 A, the compositions of which are explicitly incorporated into the disclosure content of the present specification.

Second, Pressure-Sensitive Adhesive and Optional Third, Pressure-Sensitive Adhesive PSAs are composed of a cohesion-determining polymer component (base polymer component) which in particular is elastomeric, and also of optional further components, such as tackifying resins (tackifier resins) and/or plasticizers (as adhesion-determining components), and often of further adjuvants for the development of specific properties on the part of the PSA. As a result of the composition, the PSA has viscoelastic properties. Through crosslinking of the base polymer component it is possible to insert a critical influence over the cohesion of the PSA.

The second, pressure-sensitive adhesive is based, in accordance with the invention, on one or more rubbers having a saturated carbon chain of the polyethylene type. "Based on" here denotes in particular that the base polymer component of the PSA in question is provided wholly or at least predominantly—that is, in particular, more than 50 wt %—by corresponding polymethylene-type rubbers.

Rubbers are classified according to the nature of the heteroatoms in the main chain, by allocation into different groups. The rubbers of the polymethylene type that are used in accordance with the invention for the base polymer are more particularly those of the "M type", namely synthetic rubbers having a saturated chain.

Rubbers of the M type that may be utilized advantageously in accordance with the invention are selected for example from the following list:

ACM copolymer of ethyl acrylate (or other acrylates) and a small fraction of a monomer which facilitates vulcanization (typically referred to as acrylate rubber)
AEM copolymer of ethyl acrylate (or other acrylates) and ethylene
ANM copolymer of ethyl acrylate (or other acrylates) and acrylonitrile
BIMSM terpolymer of isobutene, para-methylstyrene and para-bromoethylstyrene
CM chlorinated polyethylene1)
CSM chlorosulfinated polyethylene
EBM ethylene-butene copolymer
EOM ethylene-octene copolymer
EPDM terpolymer of ethylene, propylene and a diene, with the unsaturated part of the polymerized diene in the side chain
EPM ethylene-propylene copolymer
EVM ethylene-vinyl acetate copolymer2)
FEPM copolymer of tetrafluoroethylene and propylene
FFKM perfluorinated rubber in which all of the substituents of the polymer chain are fluoro, perfluoroalkyl or perfluoroalkoxy groups
FKM fluorinated rubber with fluoro, perfluoroalkyl or perfluoroalkoxy groups on the polymer chain
IM polyisobutene3)
NBM fully hydrogenated acrylonitrile-butadiene copolymer
SEBM styrene-ethylene-butene terpolymer
SEPM styrene-ethylene-propylene terpolymer Selected preferably from these are apolar M-type rubbers, specifically one or more rubbers selected independently of one another from EBM, EOM, EPDM, EPM, FEPM, FFKM, FKM, IM, SEBM, SEPM. Of these in turn, particular preference is given to selecting poly-alpha-olefin rubbers, specifically one or more rubbers selected independently of one another from EBM, EOM, EPDM, EPM, SEBM, SEPM, IM. The even more preferred rubbers of the above list are ethylene-alpha-olefin copolymers and/or ethylene-alpha-olefin terpolymers with dienes. These include EBM, EOM, EPDM, EPM.

In accordance with the invention, the third, pressure-sensitive adhesive may likewise conform to the above criteria for the second, pressure-sensitive adhesive, and advantageously may be identical to that adhesive. In one preferred procedure, the second, pressure-sensitive adhesive and/or the third, pressure-sensitive adhesive is based on one or more ethylene-propylene elastomers (EPM) and/or EPDM rubbers; the second, pressure-sensitive and/or the third, pressure-sensitive adhesive are therefore, in particular, adhesives for which the elastomeric component of the PSA is an EPM rubber or, more preferably, an EPDM rubber. Very preferred PSAs for the second, pressure-sensitive and/or the third, pressure-sensitive adhesive are composed of EPDM polymers that are solid at room temperature and of solid tackifying resins. Preferentially, the EPDM rubbers, as well as ethylene and propylene, contain dicyclopentadiene or 5-vinyl-2-norbornene as diene, very preferably ethylidene-norbornene (ENB).

The tackifying resins used for the second, pressure-sensitive and/or the third, pressure-sensitive adhesive preferably have a softening temperature of greater than 60° C., preferably greater than 80° C., more particularly greater than 90° C. With more particular advantage the procedure adopted is that the second, pressure-sensitive and/or the third, pressure-sensitive adhesive—in each case relative to 100 parts of solid polymers—contain 50 to 300 parts of solid tackifying resins, more particularly those having the aforesaid softening temperatures, with particular preference between 60 to 200 parts. Especially well-balanced PSAs are obtained if per 100 parts of solid rubbers of the polymethylene type, more particularly solid EPDM polymer, there are between 80 and 150 parts of solid tackifying resin.

For bonding on oiled substrates particularly it has emerged that, further to the solid rubbers of the polymethylene type, especially solid EPDM polymers, the addition of liquid rubbers of the polymethylene type, especially liquid EPDM polymers, is of advantage, more particularly in an amount between 30 to 100 parts—based on 100 parts of solid polymethylene-type rubbers, especially solid EPDM polymers.

The second, pressure-sensitive and/or the third-pressure-sensitive adhesive may be plasticizer-free, or in accordance with the invention advantageously plasticizers may have been added. Plasticizers are understood to be the plasticizing substances of low molecular mass that are known from adhesive tape technology. Plasticizers are more particularly those substances—with the exception of (liquid) rubbers of the polymethylene type, more particularly with exception of (liquid) EPDM rubbers—which have a softening point of less than 60° C., preferably less than 40° C.

Liquid plasticizers may assist the initial adhesion on oiled substrates. The fraction of plasticizers in the second, pressure-sensitive and/or in the third, pressure-sensitive adhesive, where they are present, is advantageously less than 30 wt % and is situated more preferably in the range between 5 wt % and 20 wt %, more particularly between 8 wt % and 15 wt %, based on the overall PSA formulation.

The Mooney viscosity (ML 1+4/125° C.) of the EPDM rubbers, measured according to DIN 53523, is in one preferred embodiment of the invention at least 20 to 120, more preferably 40 to 90, and more particularly 50 to 80.

The base polymer preferably consists only of EPDM rubbers, and more preferably there is no polymer in the PSA other than the EPDM rubbers.

As PSAs it is also possible, for example, to use adhesives of the kind described in DE 10 2015 217 376 A or in DE 10 2017 202 668. The advantageously employable PSA of DE 10 2015 217 376 A comprises at least one or more solid EPDM rubbers as base polymer, and also tackifying resins, the fraction of the tackifying resins being 30 to 130 phr, advantageously 50 to 120 phr, more preferably 60 to 110 phr, and is preferably low in plasticizer (up to a maximum of 1 wt % in the adhesive) or plasticizer-free.

In particular, the PSA includes in a fraction of not more than 1 wt %, or not at all, paraffinic and naphthenic oils, (functionalized) oligomers such as oligobutadienes, oligoisoprenes, liquid nitrile rubbers, liquid terpene resins, vegetable and animal oils and fats, phthalates and/or functionalized acrylates.

The fraction of the tackifying resins in the PSA is as follows. The PSA advantageously comprises at least one liquid EPDM rubber. The fraction of the liquid EPDM rubbers may preferably be up to 40 wt %, more preferably between 5 and 35 wt %, and more preferably still between 10 and 25 wt %. In one favorable embodiment, the PSA consists of a composition only comprising solid or only comprising solid and liquid EPDM rubbers and tackifying resin, with the possible additional, optional admixing of aging inhibitors. Advantageously, the fractions of all added substances (besides EPDM rubbers and tackifying resin) such as synthetic rubbers and/or thermoplastic elastomers and/or fillers and/or dyes and/or aging inhibitors does not exceed 5 wt %, preferably 2 wt %, in total.

Examples of adhesives suitable as second, pressure-sensitive adhesive and/or as third, pressure-sensitive adhesive in the present adhesive tapes of the invention are the adhesives of examples 1, 2, 3, 4, 5 and 6 of DE 10 2015 217 376 A, as disclosed on page 11 of the stated specification in the table there. The corresponding adhesive compositions are deemed explicitly to be disclosed for the present invention. Reference is made explicitly to the rest of the disclosure content of DE 10 2015 217 376 A.

The adhesive of DE 10 2017 202 668, which is likewise employable in accordance with the invention, is a PSA which is, in particular, thermally crosslinkable, comprising
  a) at least one crosslinkable polymer, the polymer being at least composed of (i) at least two monomers A and B, such as, for example, three monomers A, B and C, each of which independently of any other is an olefinically unsaturated, aliphatic or cycloaliphatic hydrocarbon, and (ii) at least one comonomer D, which is an olefinically unsaturated monomer having at least one carboxylic acid group and/or carboxylic anhydride group,
  b) at least one organosilane corresponding to the formula $R^1$—$Si(OR^2)_n R^3_m$, in which $R^1$ is a radical which is able to enter into a chemical bond with a carboxylic acid group or carboxylic anhydride group; the radicals $R^2$ independently of one another are each a hydrogen, an alkyl, a cycloalkyl, an aryl or an acyl radical; $R^3$ is a hydrogen, an alkyl, a cycloalkyl or an aryl radical; n is 2 or 3; and m is the number resulting from 3−n, and
  c) at least one tackifying resin.

The at least two monomers A and B, such as, for example, the three monomers A, B and C, of the crosslinkable polymer may independently of one another be, for example, an α-olefin having 2 to 8 C atoms, such as, for example, ethylene, propylene, 1-hexene or 1-octene, or a diene, such as, for example, 5-ethylidene-2-norbornene (ENB), dicyclopentadiene or 5-vinyl-2-norbornene.

Advantageously, monomer A is ethylene, monomer B is propylene, and monomer C, if present, is a diene, such as, for example, 5-ethylidene-2-norbornene (ENB), dicyclopentadiene or 5-vinyl-2-norbornene. Very preferably the diene may be 5-ethylidene-2-norbornene (ENB). This means that the crosslinkable polymers are in accordance with the invention, in particular, polymers based on EPDM or on EPM. The crosslinkable polymer is customarily an elastomer polymer. The polymer typically possesses an at most low degree of crystallinity, and possesses no defined melting point, as is the case, for example, for thermoplastic polymers. More particularly the crosslinkable polymer is amorphous.

Selected as comonomer D may be, for example, acrylic acid, methacrylic acid, maleic acid, maleic anhydride, fumaric acid, fumaric anhydride, methylmaleic acid, methylfumaric acid, itaconic acid, crotonic acid, crotonic anhydride, 4-methylcyclohex-4-ene-1,2-dicarboxylic anhydride, bicyclo[2.2.1]hept-5-ene-2,3-dicarboxylic anhydride, bicyclo[2.2.1]hept-5-ene-2,3-dicarboxylic acid, bicyclo[2.2.2]oct-5-ene-2,3-dicarboxylic acid, bicyclo[2.2.2]oct-5-ene-2,3-dicarboxylic anhydride, bicyclo[2.2.2]oct-7-ene-2,3,5,6-tetracarboxylic acid, bicyclo[2.2.2]oct-7-ene-2,3,5,6-tetracarboxylic anhydride, 5-norbornene-2,3-dicarboxylic acid, norborn-5-ene-2,3-dicarboxylic anhydride, tetrahydrophthalic acid or tetrahydrophthalic anhydride, preferably acrylic acid, maleic acid, maleic anhydride, fumaric acid or fumaric anhydride, and more particularly maleic anhydride.

The crosslinkable polymer is obtainable in particular through copolymerization at least of the at least two monomers A and B, such as, for example, of the three monomers A, B and C, producing a polymer, and grafting of the comonomer D onto the polymer. The crosslinkable polymer may also be obtainable through copolymerization at least of the at least two monomers A and B, such as, for example, of the three monomers A, B and C, with the comonomer D. The crosslinkable polymer preferably has a Mooney viscosity (ML 1+4/125° C.), measured according to DIN 53523, of more than 25, preferably of more than 30, more preferably still of more than 45, and more particularly of more than 55.

Advantageously, in accordance with the invention, the radicals $R^2$ of the organosilane of the formula $R^1$—$Si(OR^2)_n R^3_m$ may independently of one another each be an alkyl group or acetyl group. The alkyl group is preferably a methyl, ethyl, propyl or isopropyl group, more preferably a methyl or ethyl group, and more particularly an ethyl group. The radical $R^3$ of the organosilane of the formula $R^1$—$Si(OR^2)_n R^3_m$, if present, is preferably an alkyl group, and the alkyl group is preferably a methyl, ethyl, propyl or isopropyl group, more particularly a methyl group.

The radical $R^1$ of the organosilane of the formula $R^1$—$Si(OR^2)_n R^3_m$ preferably contains at least one hydroxyl group, at least one thio group, at least one amino group $NHR^4$, in which $R^4$ is a hydrogen, alkyl, cycloalkyl or aryl radical, or a mixture thereof. Very preferably $R^1$ contains at least one amino group $NHR^4$. If $R^4$ is an alkyl or cycloalkyl radical, said radical optionally contains at least one further amino group $NHR^4$, at least one hydroxyl group, at least one thio group, or a mixture thereof. The radical $R^1$ may be, for example, a radical X—$(CH_2)$—$(CH_2)_p$, where X is a hydroxyl group, a thio group or an amino group $NHR^4$, in which $R^4$ is a hydrogen, alkyl, cycloalkyl or aryl radical, and p is an integer from 0 to 10 and more particularly from 0 to 2. If $R^4$ is an alkyl or cycloalkyl radical, said radical optionally comprises at least one further amino group $NHR^4$, at least one hydroxyl group, at least one thio group, or a mixture thereof.

The organosilane of the formula $R^1\text{—}Si(OR^2)_n R^3{}_m$ may be, for example, N-cyclohexyl-3-aminopropyltrimethoxysilane, N-cyclohexylaminomethyltriethoxysilane, 3-aminopropyltrimethoxysilane, 3-aminopropyltriethoxysilane, 3-aminopropylmethyldiethoxysilane, 3-(2-aminomethylamino)propyltriethoxysilane or a mixture thereof. The radical $R^1$ of the organosilane of the formula $R^1\text{—}Si(OR^2)_n R^3{}_m$ may alternatively also be a radical containing at least one cyclic ether function. With particular advantage, $R^1$ in that case contains at least one epoxy group, at least one oxetane group, or a mixture thereof, and preferably contains at least one epoxy group, such as, for instance, a glycidyloxy group, at least one epoxycyclohexyl group such as, for example, a 3,4-epoxycyclohexyl group, at least one epoxyhexyl group such as, for example, a 5,6-epoxyhexyl group, at least one oxetanylmethoxy group such as, for example, a 3-oxetanylmethoxy group, or a mixture thereof. More particularly the radical $R^1$ may be a radical $Y\text{—}(CH_2)\text{—}(CH_2)_q$, where Y is an epoxide group as defined above and q is an integer from 0 to 10 and more particularly from 0 to 2.

In a further advantageous embodiment, the organosilane of the formula $R^1\text{—}Si(OR^2)_n R^3{}_m$ may be (3-glycidyloxypropyl)trimethoxysilane, (3-glycidyloxypropyl)triethoxysilane, (3-glycidyloxypropyl)methyldimethoxysilane, (3-glycidyloxypropyl)methyldiethoxysilane, 5,6-epoxyhexyltriethoxysilane, [2-(3,4-epoxycyclohexyl)ethyl]trimethoxysilane, [2-(3,4-epoxycyclohexyl)ethyl]triethoxysilane, triethoxy[3-[(3-ethyl-3-oxetanyl)methoxy]propyl]silane, or a mixture thereof.

The PSA may also comprise two or more organosilanes—including those which differ from one another—of the aforesaid definitions. Additionally, the PSA may additionally comprise at least one polymer synthesized from ethylene, propylene and optionally a diene, in which case the diene, if present, is preferably 5-ethylidene-2-norbornene (ENB), dicyclopentadiene or 5-vinyl-2-norbornene, and more particularly is 5-ethylidene-2-norbornene (ENB). The additional polymer may be solid or liquid, and preferably possesses a Mooney viscosity (ML 1+4/125° C.), measured according to DIN 53523, of less than 25, and more particularly is liquid. Reference is made explicitly to the rest of the disclosure content of DE 10 2017 202 668.

A further subject of the invention is an adhesive tape as described in the context of this specification as being in accordance with the invention or advantageously configured, where the initial peel adhesion of the adhesive tape on a sample substrate is at least 0.05 N/cm, measured according to test method A "Peel adhesion", and where the assembly of the sample substrate and the cured adhesive tape has a bond strength of at least 10 MPa, measured according to test method B "Bond strength", the sample substrate consisting of a steel surface covered with a continuous oil layer (coverage 4 $g/m^2$).

The adhesive tape of the invention features two essential, independent surprising properties. In accordance with the invention it has emerged, on one hand, that for an at least two-layer system corresponding to the invention, wherein a PSA is present in the form of a layer on a heat-curable adhesive, the initial bonding forces of the PSA on a substrate are higher than in the case of a corresponding layer of PSA without the corresponding heat-curable layer provided beneath it.

If the PSA in this case is applied incompletely to the heat-curable layer of adhesive, then the effect observed is that, with less PSA area, it is possible to achieve substantially the same initial bonding forces—or initial bonding forces that, through the choice of degree of application, meet the respective desired requirements—on the substrate to be bonded. With PSA applied only locally to the heat-curable layer of adhesive, moreover, the heat-curable PSA may likewise be brought into contact with the substrate to be bonded and may serve thereon as a curing structural adhesive. In this case it has emerged surprisingly for the adhesive tape of the invention that the final bond strength of such an assembly is only slightly lower than that of a bonded assembly of the corresponding heat-curable layer of adhesive, though not covered with PSA, on the corresponding substrate and under otherwise corresponding conditions. This could not have been expected at all, since the PSA masks a part of the surface of the heat-curable layer of adhesive and therefore, according to expectation, ought to deactivate the bond. The detractions in this case are significantly below those to be expected in each case as a result of the corresponding surface area reduction. Thus, for example, detractions of less than 10% of the overall bonding forces are observed, despite the heat-curing layer of adhesive having 50% or more of its area covered with PSA. For lower degrees of coverage of the core layer—that is, of the heat-curing layer of adhesive—the peel adhesion is even lower. It is regularly possible to observe detractions from the overall bonding forces whose numerical percentage is only up to 20% (i.e., not more than a fifth), preferably up to 15% (i.e., not more than a 7.5th), more preferably only up to 10% (i.e., not more than a tenth) of the percentage with which the PSA layer covers the core layer.

In experiments, the bond strength of the cured adhesive tape on oily steel has been found to be greater than 10 MPa, and at the same time the uncured adhesive tape initially bonds well to oiled metals, with initial peel adhesions on metals oiled at 4 $g/m^2$ having been found to be greater than 0.05 N/cm within a take time of two minutes. These initial peel adhesion forces are therefore greater than the liner removal force on the adhesive tape (more particularly, than the forces required to remove a siliconized polyester film from the adhesive tape).

The adhesive tape of the invention has the advantage that it remains permanently tacky. More particularly, the second, pressure-sensitive layer of adhesive and, where present, advantageously, the third, pressure-sensitive layer of adhesive as well has a substantially different polarity from the first, heat-curable layer of adhesive; the corresponding layers are therefore insoluble in one another.

The invention lastly embraces the use of an adhesive tape of the invention on oil- and/or grease-afflicted metal, more particularly on oil- and/or grease-afflicted steel or galvanized steel, where the metal is covered with a coherent oil layer and/or grease layer and/or layer of oil and grease of at least 0.5 g oil per $m^2$ and/or 0.5 g grease per $m^2$ and/or 0.5 g of a mixture of oil and grease per $m^2$, more particularly at least 2 $g/m^2$ of the stated chemicals, especially more than 3 $g/m^2$ of the stated chemicals.

Particularly preferred is the use of an adhesive tape of the invention for bonding sheet metal parts in the context of the body shell in automobile manufacture, especially if the materials employed there have the above-stated contaminants. Such uses are, for instance, those associated with the hem flange bonding of metal sheets, but also with the bonding of other components; the use of the adhesive tape of the invention makes a contribution in particular to reducing vibration-related disruptive effects in the manufactured automobile.

EXAMPLES

Reference Methods

A. Peel Adhesion

A1. For the uncured adhesives and for adhesive tapes, the peel adhesion to steel was determined in analogy to ISO 29862 (Method 3) at 23° C. and 50% relative humidity with a peeling velocity of 300 mm/min and a peel angle of 180°. As a reinforcing film, an etched PET film having a thickness of 36 μm was used, as obtainable from Coveme (Italy). The measuring strip was bonded by rolling on with a machine of 4 kg at a temperature of 23° C. The adhesive tapes were peeled off exactly 2 minutes after application. The measurement value (in N/cm) was obtained as the mean value from three individual measurements.

A2. To assess the peel adhesion on oily metal substrates, the steel plates were oiled with 4 g/m² of Quaker 61AUS. The procedure was otherwise in line with sub-method A1.

B. Bond Strength: Lap Shear Test

As a characteristic of the quality of the bonding achieved, the bond strength of a cured assembly produced by the method of the invention was ascertained for the various adhesive tapes. The bond strength was determined quantitatively in each case in a dynamic lap shear test based on DIN-EN 1465 at 23° C. and 50% rh for a testing velocity of 10 mm/min (results in N/mm²=MPa). The test bars employed were steel bars which were cleaned with acetone prior to bonding. The layer thicknesses of the adhesive tapes corresponded in each case to 100 μm±10 μm. The result is reported as the mean value from three measurements. Bonds with cured adhesives were measured. Curing took place at 180° C.±2° C. for 30 minutes. Measurements were conducted in each case a) with two acetone-cleaned steel plates, b) with two oil-afflicted steel plates (4 g/m² of Quaker 61AUS), and c) with one oiled and one unoiled steel substrate.

In order to assess the bond strength on oily metal substrates, acetone-cleaned steel plates in a first series of measurements and galvanized steel plates in a second series of measurements were oiled with 4 g/m² of Quaker 61AUS.

Raw Materials Used for the Layer of the First, Heat-Curable Adhesive (Adhesive K0)

| | |
|---|---|
| Breon N41H80 | Hot-polymerized nitrile-butadiene rubber having an acrylonitrile fraction of 41 wt % from Zeon Chemicals (London, UK). Mooney viscosity 70-95 according to technical data sheet. Non-thermoplastic up to 250° C. according to test method E for thermoplasticity. |
| PolyDis PD3691 | Nitrile rubber-modified epoxy resin based on bisphenol A diglycidyl ether with an elastomer content of 5 wt % and a weight per epoxide of 205 g/eq from Schill + Seilacher "Struktol". Viscosity at 25° C. of 300 Pa s. |
| PolyDis PD3611 | Nitrile rubber-modified epoxy resin based on bisphenol F diglycidyl ether with an elastomer content of 40 wt % and a weight per epoxide of 550 g/eq from Schill + Seilacher "Struktol". Viscosity at 25° C. of 10 000 Pa s. |
| Dyhard 100S | Latent curing agent from AlzChem for epoxy systems, consisting of micronized dicyandiamide for which 98% of the particles are smaller than 10 μm. |
| Dyhard UR500 | Latent uron accelerator for epoxy systems, for which 98% of the particles are smaller than 10 μm. |

Example 1—Preparation of Adhesive K0

A statement of the composition of adhesive K0 in parts by weight is given below in Table 1.

TABLE 1

| Composition of Adhesive K0 | |
|---|---|
| | K0 |
| Breon N41H80 | 20 |
| PolyDis PD3611 | 65 |
| PolyDis PD3691 | 15 |
| Dyhard 100S | 2.49 |
| Dyhard UR500 | 0.25 |

Adhesive K0 was prepared in a Haake recording extruder at an extruder fill level of 75±5%. The nitrile rubber and PolyDis PD3611 were introduced and kneaded with roller blades at 60° C. until the torque was constant. Then the other raw materials were added and kneaded. Lastly the curing agent and the accelerator were added and the compound was kneaded at around 80° C. for around 5 minutes.

The adhesive compound obtained was pressed to adhesive transfer films 500 μm thick, without bubbles, between two siliconized PET films in a vacuum press.

The peel adhesion according to reference method A (variant A1) "Peel adhesion" is 9 N/cm.

Raw Materials Used for the Layers of the Second, Pressure-Sensitive Adhesive and the Third, Pressure-Sensitive Adhesive (Adhesives K1 to K7; Oil-Adhesive Functional Layers) and Also of the Comparative Adhesive V1.

| | |
|---|---|
| Vistalon 6602 | An EPDM rubber from ExxonMobil with an ethylene fraction of 55% and a norbornene fraction of 5.2% and a Mooney viscosity of 80 MU (ML 1 + 4, 125° C.). |
| Keltan 8550C | An EPDM rubber from Arlanxeo with an ethylene fraction of 48% and a norbornene fraction of 5.5% and a Mooney viscosity of 80 MU (ML 1 + 4, 125° C.). |
| Vistalon 7700 | An EPDM rubber from ExxonMobil with an ethylene fraction of 55.5% and a norbornene fraction of 7% and a Mooney viscosity of 83 MU (ML 1 + 8, 150° C.). |
| Keltan 1519R | An ethylene-propylene copolymer from Lanxess, grafted with 1.9 wt % of maleic anhydride. The ethylene fraction is 49 wt %. |
| Trilene 67 | A liquid EPDM from Lion Elastomers having a molecular weight of 39 kDa (GPC) and an ethylidene-norbornene fraction of 9.5%. The ethylene-to-propylene ratio is 46/54. |
| Royalene 547 | A liquid EPDM from Lion Elastomers having a Mooney viscosity of 57 MU (ML 1 + 4, 150° C.) and an ethylidene-norbornene fraction of 10 wt %. The ethylene-to-propylene ratio is 63/37. |
| Escorez 1304 | A hydrocarbon resin from ExxonMobil (Ring and Ball 100° C., Tg = 53° C.). |
| Dercolyte A115 | An α-pinene tackifying resin from DRT. (Ring and Ball 115° C., Tg = 70° C.). |
| Regalite R1100 | A fully hydrogenated hydrocarbon resin from Eastman (Ring and Ball 100° C., Tg = 50° C.). |
| Escorez 1310 | A hydrocarbon resin from ExxonMobil (Ring and Ball 94° C., Tg = 47° C.). |
| Ondina 933 | A plasticizer oil from Shell having a dynamic viscosity of 212 mPa s at 20° C. |
| Catenex T121 | A colorless plasticizer oil from Shell having a dynamic viscosity of 46 mPa s at 20° C. |

-continued

| | |
|---|---|
| Natural rubber SMR L | "Standard Malaysian Rubber" of type L; standardized |
| Oppanol B150 | Polyisobutene from BASF, Molar mass: number average Mn around 425 000 g/mol, Viscosity average $M_\eta$ around 2 600 000 g/mol |
| Zinc oxide | |
| Lanolin | Wool-wax |
| Dertophene T | Terpene-phenolic resin from DRT; softening point around 95° C.; $M_w$ ~500-800 g/mol; hydroxyl value 20-50 mg KOH/g |
| Catenex T121 | Paraffinic process oil from Shell, specifications as per data sheet "Shell Catenex T 121, Aug. 7, 2009 version" |

Example 2—Preparation of Adhesives K1 to K7

Statements of the composition of adhesives K1 to K7 in each case in parts by weight (to 100 parts by weight in total) are given below in Table 2.

TABLE 2

Composition of Adhesives K1-K7

| | K1 | K2 | K3 | K4 | K5 | K6 | K7 |
|---|---|---|---|---|---|---|---|
| Vistalon 6602 | 33 | 30 | | | | | |
| Keltan 8550 | | | 40 | 50 | 60 | | |
| Keltan 7700 | | | | | | 25 | 20 |
| Trilene 67 | 23 | 20 | | | | | |
| Royalene 547 | | | | | | 35 | 30 |
| Dercolyte A115 | | | | | | 20 | 20 |
| Escorez 1304 | | | | | | 20 | 20 |
| Escorez 1310 | 44 | 40 | | | | | |
| Regalite 1100 | | | 60 | 50 | 40 | | |
| Ondina 933 | | 10 | | | | | |
| Catenex T121 | | | | | | | 10 |

Example 3—Preparation of Comparative Adhesive V1

A statement of the composition of comparative adhesive V1 in parts by weight is given below in Table 3.

TABLE 3

Composition of Comparative Adhesive V1

| | V1 |
|---|---|
| Natural rubber SMR L | 19 |
| Oppanol B150 | 9 |
| Zinc oxide | 20 |
| Lanolin | 16 |
| Dertophene T | 30 |
| Catenex T121 | 6 |

Adhesives K1 to K7 and Comparative Adhesive V1 were prepared in accordance with a customary mode of preparation in a Haake recording extruder at an extruder fill level of 75±5%, the combined components being kneaded with roller blades until the torque was constant.

Example 4—Investigation of the Peel Adhesion on Oily Metal

Production of Continuous Adhesive Transfer Tapes

In order to produce layers of adhesive, the various adhesives were applied from solution in mineral spirit to a conventional liner (siliconized polyester film) using a laboratory coating appliance, and dried. The coated-out adhesives were produced with a coat weight of 50 g/m2+/−5% (corresponding to a thickness of around 54 μm). Drying took place in each case initially at RT for 10 minutes and for 10 minutes at 105° C. in a laboratory drying cabinet. Immediately after drying, the dried layers of adhesive were each laminated on the open side with a second liner (siliconized polyester film with lower release force).

A statement of the peel adhesion according to reference method A (variant A2) is given below in Table 4A.

TABLE 4A

Peel Adhesion of Adhesives K1-K7 and Comparative Adhesive V1

| | K1 | K2 | K3 | K4 | K5 | K6 | K7 | V1 |
|---|---|---|---|---|---|---|---|---|
| Peel adhesion to steel (oiled)/N cm$^{-1}$ | 1.75 | 2.2 | 0.88 | 0.91 | 0.1 | 0.43 | 0.68 | 0.26 |

Production of Discontinuous Pressure-Sensitive Adhesive Structures

The PSAs (K1-K7) were diluted to 25% solids content and applied to a siliconized PET film via a needle driven using a metering robot. In this way, regular structures were generated from the PSA [dot and stripe patterns: dots: arrangement in the form of a square grid (dots at each of the grid-line intersects); stripes: parallel, equidistant arrangement]. The coat weights were varied in the range of 1-21 g/m2 and the surface occupancy from 2% to 60%.

From the seven illustrative PSAs (K1 to K7), seven structures S1 to S5 and VS1, VS2 were each produced on a liner, as listed below in Table 4B. They were laminated to the 500 μm thick reactive core layer K0 using a roll laminator. The nomenclature of these 49 examples is made up of the EPDM adhesive used (K1 to K7) and also of the structure applied S1-S5, VS1, VS2. Hence the designation K1S1 is code for a product build comprising the 500 μm reactive core layer K with the EPDM PSA K1, applied in the form of dots with a dot spacing of 2.5 mm and a coat weight of 6.6 g/m2 (S1).

TABLE 4B

Summary of discontinuous PSA structures

| Structural builds | S1 | S2 | S3 | S4 | S5 | VS1 | VS2 |
|---|---|---|---|---|---|---|---|
| Dot spacing*/mm | 2.5 | 5 | 10 | | | | |
| Dot diameter/mm | 1.7 | 1.7 | 1.7 | | | | |
| Line spacing**/mm | | | | 5 | 10 | 0 | 5 |
| Line width/mm | | | | 1.3 | 1.3 | 0 | 3 |
| Density of occupation/% | 16 | 5.8 | 2.1 | 15 | 6.3 | 100 | 60 |
| Coat weight/g m$^{-2}$ | 6.6 | 3.3 | 0.6 | 5.2 | 4.6 | 34 | 21 |

*respective distance from dot center to the center of closest dots
**respective distance of the stripe middle to the middle of directly adjacent stripes A product build of the invention meets the condition that the initial peel adhesion on oiled steel (according to test method A "Peel adhesion", variant A2) after two minutes is at least 0.05 N/cm. Moreover, builds of the invention have bond strengths (measured by test method B "Bond strength") of at least 10 MPa. The results are set out clearly in Table 4C below.

TABLE 4C

Initial peel adhesion on oiled steel >0.05 N/cm/ bond strength >10 MPa

|     | K1  | K2  | K3  | K4  | K5  | K6  | K7  | V1  |
| --- | --- | --- | --- | --- | --- | --- | --- | --- |
| S1  | ✓/✓ | ✓/✓ | ✓/✓ | ✓/✓ | ✓/✓ | ✓/✓ | ✓/✓ | —/✓ |
| S2  | ✓/✓ | ✓/✓ | ✓/✓ | ✓/✓ | ✓/✓ | ✓/✓ | ✓/✓ | —/✓ |
| S3  | ✓/✓ | ✓/✓ | ✓/✓ | ✓/✓ | ✓/✓ | ✓/✓ | ✓/✓ | —/✓ |
| S4  | ✓/✓ | ✓/✓ | ✓/✓ | ✓/✓ | ✓/✓ | ✓/✓ | ✓/✓ | —/✓ |
| S5  | ✓/✓ | ✓/✓ | ✓/✓ | ✓/✓ | ✓/✓ | ✓/✓ | ✓/✓ | —/✓ |
| VS1 | ✓/— | ✓/— | ✓/— | ✓/— | ✓/— | ✓/— | ✓/— | —/— |
| VS2 | ✓/— | ✓/— | ✓/— | ✓/— | ✓/— | ✓/— | ✓/— | —/— |

In Table 4C, the symbol before the oblique in each field relates to the initial peel adhesion, and the symbol after the oblique to the bond strength, the pattern therefore being initial peel adhesion/bond strength. Compliance with the conditions identified above is shown in each case with a tick (✓), conditions not met are shown with a dash (-).

The test was passed by product builds K1 to K7, each having the structures S1 to S5 (K1S1 to K7S5).

The initial peel adhesion test was in fact, indeed, also passed by the comparative example builds K1 to K7, in each case with the structure builds VS1 and VS2 (K1VS1 to K7VS2); however, the density of occupation with the functional layer is greater than 50%, thereby greatly reducing the bond strengths in the cured state.

Product builds with another conventional PSA (natural rubber-based) V1 showed very low initial peel adhesions on oiled steel for all of the structure builds (V1S1 to V1VS2).

The invention claimed is:

1. An adhesive tape for oily surfaces, comprising:
a first layer of a heat-curable adhesive; and
a second layer of a pressure-sensitive adhesive on one surface of the first layer of the heat-curable adhesive,
wherein the pressure-sensitive adhesive of the second layer is based on one or more rubbers having a saturated carbon chain of polymethylene,
wherein the second layer of the pressure-sensitive adhesive comprises a thickness in the range from 10 μm to 45 μm and at least 50% (by weight) of the one or more rubbers having a saturated carbon chain of polymethylene and 50 to 300 parts of solid tackifying resins relative to 100 parts of the one or more rubbers in solid form, the solid tackifying resins having a softening temperature of greater than 60° C., and
further wherein a surface coverage of the second layer of the pressure-sensitive adhesive on the one surface of the first layer of the heat-curable adhesive is between 5% and 50% and a coat weight of the second layer is from 0.6 g/m² to 6.6 g/m².

2. The adhesive tape of claim 1, further comprising:
a third layer of a pressure-sensitive adhesive on the other surface of the first layer of the heat-curable adhesive.

3. The adhesive tape of claim 2, wherein the pressure-sensitive adhesives of the second and third layers are chemically identical.

4. The adhesive tape of claim 2, wherein one or both of the second layer of the pressure-sensitive adhesive and the third layer of the pressure-sensitive adhesive are only present over a portion of the respective one and other surfaces of the first layer of the heat-curable adhesive.

5. The adhesive tape of claim 2, wherein a surface coverage of one or both of the second layer of the pressure-sensitive adhesive and the third layer of the pressure-sensitive adhesive on the respective one and other surfaces of the first layer of the heat-curable adhesive is between 5% and 50%.

6. The adhesive tape of claim 2, wherein one or both of the second layer of the pressure-sensitive adhesive and the third layer of the pressure-sensitive adhesive is present on the respective one and other surfaces of the first layer of the heat-curable adhesive in a dot pattern or a stripe pattern.

7. The adhesive tape of claim 2, wherein one or both of the second layer of the pressure-sensitive adhesive and the third layer of the pressure-sensitive adhesive is present on the respective one and other surfaces of the first layer of the heat-curable adhesive in an irregular pattern.

8. The adhesive tape of claim 2, wherein one or both of the second layer of the pressure-sensitive adhesive and the third layer of the pressure-sensitive adhesive is present in the form of geometric shapes over the respective one and other surfaces of the first layer of the heat-curable adhesive, and further wherein the geometric shapes extend continuously in at least one direction or are arranged discontinuously.

9. The adhesive tape of claim 8, wherein the geometric shapes comprise lines, dots, or combinations thereof.

10. The adhesive tape of claim 4, wherein the portion of the one or both of the second and third layer of the pressure-sensitive adhesive over the respective one and other surfaces of the first layer of the heat-curable adhesive further defines an exposed portion of the one surface of the first layer of the heat-curable adhesive, and further wherein the exposed portion is no longer than 5 cm.

11. The adhesive tape of claim 8, wherein the geometric shapes comprise one or both of uninterrupted and interrupted lines having a width of no more than 1.5 mm.

12. The adhesive tape of claim 1, wherein the heat-curable adhesive comprises an epoxy resin and at least one epoxy resin curing agent.

13. The adhesive tape of claim 1, wherein the heat-curable adhesive comprises one or more polymers, one or more optional tackifying resins, one or more reactive resins, and at least one initiator, curing agent and accelerator, wherein the one or more reactive resins are present in a weight excess over a subtotal of the one or more polymers and the one or more optional tackifying resins, and further wherein the one or more polymers are present as a continuous polymer phase in an uncured state of the heat-curable adhesive.

14. The adhesive tape of claim 1, wherein the heat-curable adhesive further comprises a pressure-sensitive adhesive property in which the heat-curable adhesive enters into a permanent bond to a substrate under applied pressure at room temperature.

15. The adhesive tape of claim 2, wherein one or both of the second and the third layer of the pressure-sensitive adhesive is based on one or more rubbers of the M type, the M type being a synthetic rubber having a saturated chain.

16. The adhesive tape of claim 2, wherein one or both of the second and the third layer of the pressure-sensitive adhesive is based on one or more ethylene-propylene elastomers.

17. The adhesive tape of claim 1, wherein the adhesive tape exhibits an initial peel adhesion of at least 0.05 N/cm, as measured on a sample substrate according to Reference Method A, Peel Adhesion, and further wherein the adhesive tape, as cured, exhibits a bond strength of at least 10 MPa, as measured on the sample substrate according to Reference Method B, Bond Strength: Lap Shear Test, the sample substrate consisting of a steel surface covered with a continuous oil layer at a surface coverage of 4 g/m².

18. An oil-covered metal, comprising:
an oil-covered steel or galvanized steel, wherein the steel is fully covered with an oil layer of at least 0.5 $g/m^2$; and
an adhesive tape for oily surfaces according to claim 1, wherein the tape is disposed on the oil-covered steel or galvanized steel.

19. The oil-covered metal according to claim 18, wherein the steel is fully covered with an oil layer of at least 3 $g/m^2$.

20. The adhesive tape of claim 2, wherein one or both of the second layer of the pressure-sensitive adhesive and the third layer of the pressure-sensitive adhesive is present in the form of geometric shapes over the respective one and other surfaces of the first layer of the heat-curable adhesive, and further wherein the geometric shapes extend continuously in at least one direction.

21. The adhesive tape of claim 1, wherein the one or more rubbers having a saturated carbon chain of polymethylene comprise one or more solid EPDM polymers and one or more liquid EPDM polymers, the one or more liquid EPDM polymers in an amount between 30 to 100 parts based on 100 parts of the one or more solid EPDM polymers.

\* \* \* \* \*

UNITED STATES PATENT AND TRADEMARK OFFICE
CERTIFICATE OF CORRECTION

PATENT NO. : 11,920,066 B2
APPLICATION NO. : 17/272522
DATED : March 5, 2024
INVENTOR(S) : Schuh et al.

It is certified that error appears in the above-identified patent and that said Letters Patent is hereby corrected as shown below:

In the Specification

Column 8; Line 27:
"$\theta$" should be — $\delta$ —.

Column 15; Line 28:
"methyldiethoxysi lane" should be — methyldiethoxysilane —.

Signed and Sealed this
Twenty-fifth Day of June, 2024

Katherine Kelly Vidal
*Director of the United States Patent and Trademark Office*